United States Patent
Bernard et al.

(10) Patent No.: US 8,188,171 B2
(45) Date of Patent: May 29, 2012

(54) POLYISOCYANATE COMPOSITION HAVING IMPROVED IMPACT-PROOF PROPERTIES

(75) Inventors: Jean-Marie Bernard, Saint Laurent d'Agny (FR); Mathias Dubecq, Lyons (FR)

(73) Assignee: Rhodia Chimie, Aubervilliers (FR)

( * ) Notice: Subject to any disclaimer, the term of this patent is extended or adjusted under 35 U.S.C. 154(b) by 992 days.

(21) Appl. No.: 11/793,489

(22) PCT Filed: Dec. 20, 2005

(86) PCT No.: PCT/FR2005/003197
§ 371 (c)(1),
(2), (4) Date: Oct. 29, 2007

(87) PCT Pub. No.: WO2006/067326
PCT Pub. Date: Jun. 29, 2006

(65) Prior Publication Data
US 2008/0044578 A1 Feb. 21, 2008

(30) Foreign Application Priority Data
Dec. 21, 2004 (FR) .................................. 04 13669

(51) Int. Cl.
*C08K 5/00* (2006.01)

(52) U.S. Cl. ..................... 524/123; 427/385.5; 526/310; 528/44; 528/45; 528/68

(58) Field of Classification Search .................... 524/123
See application file for complete search history.

(56) References Cited

U.S. PATENT DOCUMENTS

| | | | | |
|---|---|---|---|---|
| 5,877,254 A | * | 3/1999 | La Casse et al. | 524/590 |
| 5,977,246 A | * | 11/1999 | Fenn | 524/590 |
| 6,217,941 B1 | * | 4/2001 | Bernard et al. | 427/358 |
| 6,509,396 B1 | * | 1/2003 | Hoppe et al. | 524/35 |
| 2001/0021746 A1 | | 9/2001 | Nabavi et al. | |
| 2004/0242833 A1 | | 12/2004 | Bernard | |

FOREIGN PATENT DOCUMENTS

| | | |
|---|---|---|
| DE | 197 25 507 A1 | 12/1998 |
| EP | 1 074 590 A2 | 2/2001 |
| FR | 2 243 983 A1 | 4/1975 |
| GB | 1 487 563 | 10/1977 |
| JP | 08-176477 | 7/1996 |
| JP | 2001-323123 | 11/2001 |
| JP | 2003-292887 | 10/2003 |
| WO | 01/05861 A1 | 1/2001 |

* cited by examiner

*Primary Examiner* — Doris Lee
(74) *Attorney, Agent, or Firm* — Buchanan Ingersoll & Rooney PC

(57) ABSTRACT

The invention relates to the use of additived (poly)isocyanate compositions for producing coatings, especially paints or varnishes for car bodywork parts, said compositions having excellent impact-resistant properties, especially grit-resistant properties.

36 Claims, No Drawings

POLYISOCYANATE COMPOSITION HAVING IMPROVED IMPACT-PROOF PROPERTIES

CROSS REFERENCE TO PRIORITY APPLICATIONS

This application is the United States national phase of International Application No. PCT/FR2005/003197, filed Dec. 20, 2005, published as International Publication No. WO 2006/067326 A1 on Jun. 29, 2006, and claims priority of French Application No. 0413669, filed Dec. 21, 2004, each hereby expressly incorporated by reference in its entirety and each assigned to the assignee hereof.

The present invention relates to the use of additive-containing (poly)isocyanate compositions for producing coatings, especially paints or varnishes for car body parts.

The fields of application in which coatings are used are very broad and increasingly require highly sophisticated coating compositions having excellent qualities in terms of both the application of the coating and the characteristics of the finished product.

There is a constant demand for coatings having improved properties, in particular having a faster drying rate, greater impact resistance and improved behaviour with respect to all types (organic, microbial or atmospheric) of chemical attacks and also improved resistance to pressure washing, in particular in the case of substrates made of plastics materials.

In the car industry, for example, there is a high demand for coating compositions having excellent impact resistance, in particular grit resistance, properties, in particular for coating compositions intended for original equipment manufacture, i.e. as a priming body coating, as a base coating or else as a top coat.

Known are one-component (1K) coating formulations based on blocked polyisocyanates, for example for OEM (original equipment manufacture), for coil coating or else can coating. The blocked polyisocyanates generally impart highly acceptable physicochemical properties to the substrates thus coated and usually meet manufacturers' requirements in terms of appearance and performance, even if the means of application differ in the fields in the question.

Also known are polyisocyanate-based aqueous coating formulations. However, this type of aqueous formulation is poorly adapted to the industrial coating means currently used, in particular in the automotive field.

The coatings obtained with these known formulations generally have either an acceptable "hardness" characteristic necessary for the use in question or a "flexibility" characteristic crucial for good grit resistance. There remains a need for coating formulations which are able to combine "hardness" and "flexibility", especially in the automotive or aeronautical fields where high performance, durable and impact-resistant coatings, in particular of the grit type, are required.

Thus, a first object of the present invention is to provide a coating composition having better hardness and resilience properties than the coating compositions known in the art.

A further object of the present invention is to provide a coating composition having improved hardness and resilience properties, such as an original equipment manufacturer coating.

A further object of the present invention is to provide a non-aqueous coating composition having improved hardness and resilience, such as an original equipment manufacturer coating.

A further object of the invention is to propose a non-aqueous coating composition having improved hardness and resilience properties, such as an original equipment manufacturer coating which can be used in the automotive, aeronautical and railway fields.

Still further objects will become apparent from the following disclosure of the invention.

Thus, the present invention relates firstly to the use of a composition in the form of a solution comprising:
a) at least one (poly)isocyanate composition;
b) at least one surfactant;
c) at least one compound carrying at least one mobile hydrogen group selected from the primary or secondary hydroxyl, phenol, primary and/or secondary amine or carboxylic groups and an SH group; and
d) at least one organic solvent,
for the preparation of a coating by crosslinking by heat treatment.

The crosslinking of said composition is generally carried out at a temperature of between 60° C. and 300° C., preferably greater than 80° C. and less than 300° C., advantageously between 100° C. and 200° C., for a duration of between a few seconds and a few hours.

According to a particularly advantageous embodiment of the use of the present invention, the composition in solution form may further comprise:
e) at least one aminoplastic resin ("aminoplast") of the melamine-aldehyde, in particular melamine-formaldehyde, and/or urea-aldehyde, in particular urea-formaldehyde, or benzoguanamine type, and/or the alkoxyalkyl derivatives thereof.

For the aforementioned use, the composition may also contain:
f) at least one catalyst for the reaction between the compound a) and the compound c), and/or at least a strong-acid-type compound, or a latent form of said strong acid, for example tertiary amine salt, as a catalyst for the reaction between the melamine and/or urea compounds or the derivatives thereof and the true urethane or carbamate groups.

The coating composition defined hereinbefore may further comprise pigments and a broad range of additives facilitating the use of the formulation or the formation of the coatings, i.e. additives for rheology, spreading and the like.

The coating obtained using the composition defined hereinbefore has an attractive appearance, good mechanical properties and in particular improved strength in terms of hardness, grit resistance and good resistance to various chemical and/or biological attacks.

The present invention further provides an excellent compromise between flexibility and hardness—a particularly sought-after compromise in the automotive or aeronautical field.

These improved properties are obtained, in particular, when the composition is used as a hardener for the "priming" layer of a coating ("primer"). The term "priming layer" refers, in the case of metallic substrates and in particular car parts, to the layer applied directly to the cataphoretic layer which is crosslinked by heat treatment, for example in a furnace, at a generally elevated temperature, i.e. greater than 60° C., in particular greater than 80° C., or even greater than 100° C.

The crosslinking is generally obtained by heat treatment of the coated substrate. Other treatments are conceivable, but heat treatment is preferred. The term "heat treatment" generally refers to the passing or dwelling of the coated substrate in a furnace at an elevated temperature, i.e. greater than 60° C., in particular greater than 80° C., advantageously greater than 100° C., for a duration sufficient to allow crosslinking of the coating formulation.

Other heating means are conceivable, such as for example heating guns allowing heating of merely a portion of the substrate or else heating by infrared radiation.

A crosslinking temperature of less than 60° C. is conceivable, the crosslinking in this case taking longer. Crosslinking carried out at a temperature of about 300° C., on the other hand, will take merely a few tens of seconds, or even a few seconds; this is known as "flash stoving".

There is then generally deposited on the "priming" layer what is known as a base layer, using the "wet-on-wet" method, then a final varnish layer known as the clear coat.

It will be understood that the term "coating", as used in the present context, comprises one or more of the various aforementioned layers, generally at least three layers, of which at least a layer, preferably the priming layer, is a composition according to the invention. However, the present invention is not limited to the use of the coating formulation for producing a priming layer.

Therefore, the properties obtained concern all of the coating consisting of the various layers. In particular, the grit resistance properties are measured over the single or multiple-layer coating as a whole.

The use forming one of the subject-matters of the present invention is particularly well suited in the field of original equipment manufacturer (OEM) polyurethane-based industrial paints for which the coatings obtained have, inter alia, improved hardness and grit resistance.

It has surprisingly been found that some of the compositions envisaged within the invention allow this latter property of grit resistance to be preserved, or even improved, during operations for touching up the coating to eliminate blemishes.

This touching-up is characterised by polishing of the defective coating followed by a second application of the base and the varnish and by crosslinking resulting from restoving. Generally, this touch-up operation impairs the anti-grit property of the final coating. The compositions used in the present invention allow this problem, in particular, to be overcome.

There is a particular need among car paint manufacturers to preserve this property of grit resistance during touch-up operations.

The term "high grit resistance" or "anti-grit properties" refers to the property of the coatings to resist multiple and frequent impacts caused by hard items, in particular small more or less spherical items, which strike the surface of the coated substrate at more or less high speeds so as to form with said surface a broad range of angles and reproduce the conditions of impact of a vehicle body with the grit of the road surface.

The compositions used as coatings under the terms of the present invention also provide particularly suitable resistance to various attacks of chemical origin such as for example solvents, and/or of biological origin, such as animal excreta, in particular bird droppings.

The properties desired for coatings, in particular paint-type coatings especially for car body parts, include high hardness, good adherence to the substrate, high resistance to chemical attacks, good UV resistance, a high degree of brightness, good colour retention, high impact resistance and also good properties of adhesion, especially to a plastics material substrate.

Good "anti-grit" properties are particularly desirable for substrates subjected to repeated impacts, especially car body parts and in particular the parts located on the front face of the vehicle.

It has now surprisingly been found that these properties can be significantly improved by varying the (poly)isocyanate, the component reacting with the (poly)isocyanate by crosslinking, typically a polyol, or else other components present in the paint formulation.

Known are paint formulations based on aqueous-phase polyurethane which consist of a masked polyisocyanate, a polyol and a surfactant and have improved mechanical properties, especially impact resistance and in particular grit resistance of the polyurethane coatings.

This improvement of properties was accounted for by the influence of the surfactant on the size of the polyisocyanate particles (cf. patent application WO 01/05861) and by improved compatibility with the polyol dispersion.

In the case of the present invention, the use of the (poly) isocyanate composition allows the preparation of a polyurethane coating having the appearance of a non-aqueous one-component (1K) formulation, or else of a two-component (2K) formulation, of the solvent-containing formulation type, in which the (poly)isocyanate and the polyol are perfectly soluble and miscible without the need to add a surfactant seeking to refine the size of the particles.

However, it has surprisingly been found that the addition of surfactant compounds to this solvent-containing non-aqueous formulation for polyurethane paint allows the impact resistance properties to be improved in a completely unexpected manner and the hardness/flexibility compromise, especially the grit resistance, to be optimised.

This benefit is all the greater in view of the fact that this property is obtained in the presence of aminoplastic resins, also known as "aminoplast" resins (of the melamine formol or urea formol or benzoguanamine formol type) often leading to hard or even brittle coatings incompatible with good anti-grit properties.

It is particularly beneficial to emphasize that the presence of surfactant in the composition allows the polyurethane/melamine coating to undergo the touch-up operation to eliminate blemishes while at the same time preserving the noteworthy grit resistance property already provided.

Indeed, it has often been found with the coating compositions of the prior art that post-cured films of this type obtained from compositions not containing surfactant additives of this type become much more brittle, resulting in a loss of the anti-grit property and also a reduction in the hardness/flexibility compromise.

The present invention thus also relates to a composition in the form of a solution as defined hereinbefore and comprising:

a) at least one (poly)isocyanate composition;
b) at least one surfactant;
c) at least one compound carrying at least one mobile hydrogen group selected from the primary or secondary hydroxyl, phenol, primary and/or secondary amine, carboxylic groups and an SH group; and
d) at least one organic solvent.

According to a particularly advantageous embodiment, the composition in solution form may also comprise:

e) at least one aminoplastic resin ("aminoplast") of the melamine-aldehyde, in particular melamine-formaldehyde, and/or urea-aldehyde, in particular urea-formaldehyde, or benzoguanamine type, and/or the alkoxyalkyl derivatives thereof.

Furthermore, the composition according to the present invention may also contain:

f) at least one catalyst for the reaction between the compound a) and the compound c), and/or at least a strong-acid-type compound, or a latent form of said strong acid, for example a tertiary amine salt, as a catalyst for the reaction between the melamine and/or urea compounds or the derivatives thereof and the true urethane or carbamate groups.

The composition described hereinbefore generally comprises:
from 5% to 20% by weight of at least one (poly)isocyanate composition and at least one surfactant, based on the total weight of the composition without solvent (% over dry matter);
from 55% to 80% by weight of at least one compound carrying at least one mobile hydrogen group selected from the primary or secondary hydroxyl, phenol, primary and/or secondary amine, carboxylic groups and an SH group, based on the total weight of the composition without solvent (% over dry matter); and
from 35% to 55%, advantageously approximately 45% by weight, of at least one organic solvent based on the total weight of the composition.

If the composition according to the invention comprises at least one aminoplast resin, said resin is generally present in a proportion of from 15% to 25% by weight based on the total weight of the composition without solvent (% over dry matter).

The amount of reaction catalyst(s) present in the composition of the present invention is usually between 0% and 0.5% by weight based on the total weight of the composition without solvent (% over dry matter).

The term "surfactant" refers, in the context of the present invention, basically to a compound having the property of rendering hydrophobic and hydrophilic compounds mutually miscible. It will therefore be understood that the term "surfactant", as used in the present invention, does not in any way signify a compound liable to form any desired suspension or any desired emulsion.

It should be noted that the coating composition according to the invention is a solution, as opposed to an emulsion, dispersion, latex or the like, and more specifically a homogeneous mixture of at least the compounds defined hereinbefore under a), b), c) and d). This signifies a very low presence of water in the composition of the present invention and, in particular, a ratio by weight of (water)/[(poly)isocyanates+surfactant] of between 0 and 10%, preferably between 0 and 5%, advantageously between 0 and 1% inclusive.

According to a particularly preferred embodiment, the ratio by weight of said (water)/[(poly)isocyanate+surfactant] is between 0 and 0.5%, preferably between 0 and 0.1% inclusive.

The surfactant used is particularly advantageously an anionic surfactant or else or a nonionic surfactant optionally comprising a polyethylene glycol and/or propylene glycol chain fragment of at least 1, advantageously at least 5, preferably at least 7 oxyethylenyl and/or oxypropylenyl units.

Advantageously, the surfactant is selected so as to comprise few or no groups reacting with the (poly)isocyanate. In other words, the surfactant is present in the solvent-containing composition in a basically free form (as opposed to a form bound to the (poly)isocyanate via a chemical bond).

The term "basically free form" signifies that less than 50%, advantageously less than 20%, preferably less than 10% by mass of the surfactant is in bound form.

However, the compositions in solution form in which the surfactant is completely bound, covalently, to the (poly)isocyanates are also included in the scope of the present invention.

According to a preferred embodiment, the surfactant is an anionic agent having at least one group selected from the aryl and alkyl sulphates or phosphates and the aryl or alkyl phosphonates, phosphinates and sulphonates.

Also preferably, the anionic surfactant comprises a hydrophilic portion formed, for example, from said anionic group of said polyethylene glycol and/or polypropylene glycol chain fragment and of a lipophilic portion based on a hydrocarbon radical. The lipophilic portion is preferably selected from the, preferably $C_6$-$C_{30}$, alkyl and aryl groups.

It will be appreciated that the composition in solution form of the present invention may comprise a mixture of at least two surfactants as described in the present description.

Particular preference is given to an anionic surfactant corresponding to the following Formula (I):

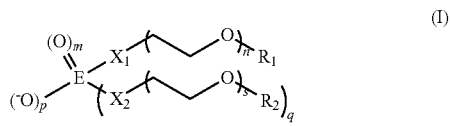

wherein:
E represents an element selected from phosphorus, carbon and sulphur;
$R_1$ and $R_2$ are the same or different and independently of one another represent a hydrocarbon radical, advantageously selected from the optionally substituted $C_6$-$C_{30}$ aryl radicals and $C_1$-$C_{20}$ alkyl radicals, advantageously optionally substituted $C_{10}$-$C_{20}$ alkyl radicals;
$X_1$ represents a bond or a divalent radical selected from —$Y_1$—, -$A_1$-, -$A_1$-$Y_1$—, —$Y_1$-$A_1$-, —$Y_1$-$A_1$-$Y'_1$ and [E(O)$_m$(O$^-$)$_p$]-;
$X_2$ represents a bond or a divalent radical selected from —$Y_2$—, -$A_2$-, -$A_2$-$Y_2$—, —$Y_2$-$A_2$- and —$Y_2$-$A_2$-$Y'_2$;
$A_1$ and $A_2$ are the same or different and independently of one another represent an optionally substituted, including functionalised, alkylene divalent radical and for example ethylene or methylene;
$Y_1$, $Y'_1$, $Y_2$ and $Y'_2$ are the same or different and are selected from a chalcogen, advantageously selected from the lightest chalcogens, namely sulphur and in particular oxygen, metalloid elements of atomic ranks at most equal to that of phosphorus and those of column VB of the periodic table of elements classification, in the form of amines or tertiary phosphine derivatives, the radical providing the tertiary character advantageously containing at most 4 carbon atoms, preferably at most 2 carbon atoms;
m represents 0 or an integer equal to 1 or to 2;
n is 0 or an integer selected between 1 and 30, advantageously between 5 and 25, preferably between 9 and 20 (closed ranges, i.e. including the limit values);
p represents an integer equal to 1, 2 or 3;
q represents 0 or 1; and
s represents 0 or an integer between 1 and 30, advantageously between 5 and 25, preferably between 9 and 20 (closed ranges, i.e. including the limit values);
it being understood that if E represents the carbon atom then q is equal to 0, m represents 1 and $X_1$ represents a bond or a divalent radical selected from
-$A_1$-, —$Y_1$—, -$A_1$-$Y_1$—, —O—C(=O)—O— and —[C(O)$_m$(O$^-$)$_p$]—.

Although it is not part of the preferred compounds, it should be noted that s and/or n may be equal to zero, provided that E is phosphorus and that if s and n are equal to zero, $R_1$ and/or $R_2$ respectively represent, advantageously branched, $C_8$-$C_{16}$ alkyls, $C_{12}$-$C_{16}$ aralkyls or $C_{10}$-$C_{14}$ alkylaryls.

When E represents the phosphorus atom and $X_1$ represents a -[E(O)$_m$(O$^-$)$_p$]$^-$, radical, the compound of Formula (I) belongs to the family pyro-acids such as the symmetrical or asymmetrical diesters of pyrophosphoric acid.

The total carbon number in the surfactants of Formula (I) addressed by the present invention is advantageously at most 100, preferably at most 60, advantageously at most 50.

The divalent radical $X_1$ and optionally the divalent radical $X_2$ may advantageously be selected from the following divalent radicals (the left-hand portion of the formula being bound to E):

When E represents the phosphorus atom, one of $X_1$ or $X_2$ may be selected from —O—P(=O)(O$^-$)—X"— and —O—($R_{10}$—O)P(=O)—X", $R_{10}$ representing a $C_2$ to $C_{30}$ hydrocarbon radical comprising one or more oxyethylenyl or oxypropylenyl units, advantageously at least 5, preferably at least 7 oxyethylenyl or oxypropylenyl units, and X' representing an oxygen atom or a single bond.

A direct bond between E and the first divalent ethylene radical of said polyethylene glycol (or polypropylene glycol) chain fragment;

An optionally substituted divalent methylene radical which is in this case advantageously partially functionalised;

A divalent radical selected from —$Y_1$—, -$A_1$-, -$A_1$-$Y_1$—, —$Y_1$-$A_1$-, —$Y_1$-$A_1$-$Y'_1$ and -[E(O)m(O-)p]-, in the case of $X_1$ and from —$Y_2$—, -$A_2$-, -$A_2$-$Y_2$—, —$Y_2$-$A_2$- and —$Y_2$-$A_2$-$Y'_2$ in the case of $X_2$, wherein $Y_1$, $Y'_1$, $Y_2$ and $Y'_2$ are as defined hereinbefore, and $A_1$ and $A_2$ are the same or different and independently of one another represent an optionally substituted, including functionalised, alkylene radical, $A_1$ and $A_2$ advantageously being ethylene or methylene, preferably ethylene in the structures -$A_1$-$Y_1$— (or -$A_2$-$Y_2$—) and in particular —$Y_1$-$A_1$-$Y'_1$— or (—$Y_2$-$A_2$-$Y'_2$—), and methylene in the structures -$A_1$-$Y_1$— (or -$A_2$-$Y_2$—).

When E represents the phosphorus atom, Formula (I) becomes Formula (II):

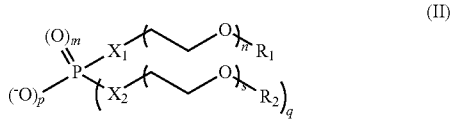

(II)

which, if q is 0, becomes Formula (II'):

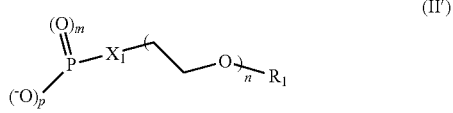

(II')

Formulae (II) and (II') in which $R_1$, $R_2$, $X_1$, $X_2$, m, n, p, q and s are as defined hereinbefore.

When E represents the carbon atom, Formula (I) becomes Formula (III):

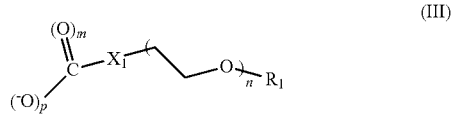

(III)

wherein $R_1$, m, n and p are as defined hereinbefore and $X_1$ represents a bond or a divalent radical selected from -$A_1$-, -$A_1$-$Y_1$—, and —[C(O)$_m$(O$^-$)$_p$]—, wherein $A_1$ and $Y_1$ are as defined hereinbefore.

Among the surfactants which may be used in the present invention, particularly preferred are those of the foregoing Formula (II) in neutralised or non-neutralised form and having the following structure (II$_1$) or structure (II$_2$):

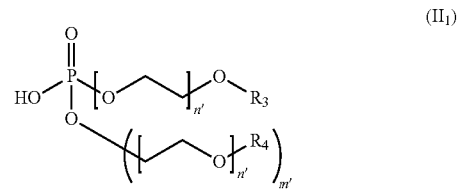

(II$_1$)

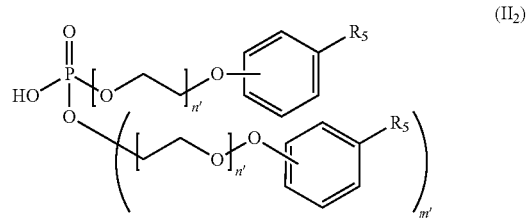

(II$_2$)

Structures wherein:
n' represents an integer between 5 and 12 inclusive;
m' represents 0 or 1;
$R_3$ and $R_4$ are the same or different and independently of one another represent a linear or branched alkyl radical comprising from 10 to 20 carbon atoms;
$R_5$ represents a linear or branched alkyl radical comprising from 6 to 12 carbon atoms.

Particular preference is given to the compounds of structure (II$_1$) wherein $R_3$ and $R_4$ each represent an alkyl radical comprising 13 carbon atoms, for example the radical n-$C_{13}H_{27}$.

Also preferred are the compounds of structure (II$_2$) wherein $R_5$ represents an alkyl radical comprising 9 carbon atoms, for example n-$C_9H_{19}$.

In the foregoing formulae, the oxyethylene groups may be partially replaced with oxypropylene groups. However, in this case, it is desirable for the compounds to comprise mostly oxyethylene groups.

The periodic classification of elements used in the present application is that of the supplement to the Bulletin de la Société Chimique de France, January 1996, No. 1.

The optional functionalisation of the alkylenes and, in particular, methylenes ($X_1$, $X'_1$, $X_2$ and $X'_2$) is carried out by hydrophilic groups (tertiary amines and other anionic groups including those described hereinbefore in the form -[E(O)$_m$(O$^-$)$_p$]—).

The counter-cation is advantageously monovalent and is selected from the, advantageously non-nucleophilic, inorganic cations and organic cations of quaternary or tertiary type, in particular the "oniums" from column V of the periodic classification of elements, such as phosphonium, ammonium, or from column VI of said classification, such as sulphonium, and the like, and the mixtures thereof. Preferred are the ammonium counter-type counter-cations derived from an, advantageously tertiary, amine. Preferably, the organic cation also does not have a hydrogen atom reacting with the isocyanate group.

These tertiary amines can optionally have ultraviolet (UV) radiation protection properties such as the amines known as "Hals amines"; Examples of these include N,2,2,6,6-pentamethylpiperidine.

The inorganic cations can be sequestered by phase transfer agents such as crown ethers.

The pKa of the organic or inorganic cations is advantageously between 8 and 12.

The cations and, in particular, the amines corresponding to the ammoniums advantageously do not have a surfactant property; however, it is desirable for them to have good solubility, sufficient in any case to provide at the concentration of use the surfactant property of said compounds comprising an anionic group and advantageously an aqueous-phase polyethylene glycol chain fragment.

The tertiary amines having at most 12 carbon atoms, advantageously at most 10 carbon atoms, preferably at most 8 carbon atoms per "onium" group (it will be noted that it is preferred that there is just one onium group per molecule), are preferred. The amines may comprise other groups and, in particular, the groups corresponding to the groups of the amino acids and cyclic ether groups, such as N-methylmorpholine, or non-cyclic groups. These other groups are advantageously in a form which does not react with the isocyanate groups and do not significantly alter the solubility in the organic phase.

When the composition according to the invention comprises the surfactant in anionic form, said surfactant is capable of reacting with the isocyanate groups. It may thus be advantageous to use the anionic surfactant according to the present invention in a neutralised form so the pH induced during dissolution or bringing-into-contact in water is at least equal to 3, advantageously to 4, preferably to 5 and at most equal to 12, advantageously to 11, preferably to 10. However, this neutralisation is not necessary if most of the isocyanate groups of the (poly)isocyanate composition are masked, as will be mentioned hereinafter.

when E represents phosphorus, it is desirable to use monoester and diester mixtures in a molar ratio of between $1/10$ and 10, advantageously between $1/4$ and 4. Such mixtures may further comprise from 1% to approximately 20%, but preferably no more than 10%, by mass of phosphoric acid, and from 0 to 5% of pyrophosphoric acid esters. Advantageously, the phosphoric acid is at least partly salified so as to fall within the recommended pH ranges.

In monoesters and diesters, a portion of the oxyethylene groups may be replaced with oxypropylene groups. Nevertheless, the majority of the groups are preferably oxyethylene groups.

The presence of triester compounds is possible, provided that these compounds are not too light. In general, at least one of the three ester groups has to have a carbon number greater than 5, preferably greater than 6, or at least two of the three ester groups have to have a carbon number greater than 2.

The surfactants of the above-defined Formula (I) may be kept in their acid form (the charge O$^-$ in this case being replaced by the OH group) if they are introduced into the polyisocyanate formulation after the isocyanate group masking reaction.

According to a second embodiment, the surfactant is a nonionic surfactant.

In general, if a nonionic surfactant is used, it has hydrophilic groups such as, for example, oxyethylene groups in sufficient number, generally greater than about 10. This surfactant also has a hydrophobic portion which may be selected from the aromatic groups carrying aliphatic chains or simply from aliphatic chains having a number of carbon atoms between 8 and 50. Other hydrophobic units such as silicone or fluorinated units may also be used for specific applications.

There may be cited, by way of non-limiting examples, the derivatives of polyoxyalkylene esters of fatty acids, ethoxylated alkylphenols, ester-phosphates having a polyalkyloxy alkylene glycol chain (such as polyethoxy and/or propoxy ethylene glycols, for example) and tristyrylphenols having a polyethylene oxide chain.

Particularly preferred is a surfactant selected from one of the condensates of poly(ethylene oxide) and/or poly(propylene oxide) with alcohols, polyols, alkylphenols, fatty acid esters, fatty acid amides and fatty amines, and sugars, in particular sugar esters.

According to the invention, use may also be made of a mixture of (neutralised or non-neutralised) anionic surfactants and/or nonionic surfactants.

As indicated hereinbefore, the presence of surfactant in the composition according to the invention allows the impact resistance properties to be improved and the hardness/flexibility compromise to be optimised. In the present invention, the object of the surfactant is therefore not to obtain an emulsion, still less to obtain a stable emulsion.

Thus, the amount of surfactant or the mixture of surfactants has to be relatively low in relation to the composition of (poly)isocyanates. This amount is advantageously less than 20% by weight based on the composition of (poly)isocyanates, preferably less than 15% by weight, and more preferably less than 10%, for example less than 8% by weight, or even less than 6% by weight.

Said amount is at least equal to 0.1%, preferably at least equal to 0.25%, more particularly at least equal to 5% by weight based on the weight of the composition of (poly)isocyanates.

If the surfactant corresponds to one of the above-defined Formulae (I), (II), (II') or (III), it is also desirable for the amount of said surfactant(s) present in the composition according to the invention to correspond to a value of between $10^{-2}$ and 1, advantageously between $5.10^{-2}$ and 0.5 atoms of E per litre of solution.

Thus, the ratio by mass between the composition of (poly)isocyanates and said surfactant(s) is advantageously at least equal to 1%, preferably 2%, advantageously 4%, and at most equal to 30%, preferably to 20%, advantageously to 10%. Thus, this ratio by mass is advantageously between 1% and 30%, preferably between 2% and 20%, advantageously between 4% and 10%.

The (poly)isocyanate composition included in the composition according to the invention consists of any isocyanate and polyisocyanate, alone or mixed with one or more isocyanates and/or polyisocyanates. The term "(poly)isocyanate" must be understood in this context as encompassing the terms "isocyanate" and "polyisocyanate".

The preferred (poly)isocyanates are selected from the homocondensation or heterocondensation products of alkylene diisocyanate including, in particular, "biuret"-type and "trimer"-type products or even "prepolymers" having an isocyanate group including, in particular, urea, urethane, allophanate, ester, amide, acylurea, isocyanurate, oxadiazinetrione, imino-dimer, imino-trimer, (iminotriazadione), imino-oxadiazinedione (also known as asymmetrical trimer), diazetidinedione (also known as dimer) groups and from the mixtures containing the same.

The polyisocyanate compounds may also comprise true carbamate groups (R—O—C(=O)—NH$_2$) or preferably cyclic epoxy groups or carbonate groups.

The compounds may, for example, be polyisocyanates sold by Rhodia under the name "Tolonate®".

Generally, the preferred (poly)isocyanates are the products of homocondensation or heterocondensation of the following aliphatic, cycloaliphatic or arylaliphatic isocyanate monomers:
1,6-hexamethylene diisocyanate,
1,12-dodecane diisocyanate,
cyclobutane-1,3-diisocyanate
cyclohexane-1,3 and/or 1,4-diisocyanate,
1-isocyanato-3,3,5-trimethyl-5-diisocyanatomethyl cyclohexane (isophorone diisocyanate, IPDI),
isocyanatomethyloctylene diisocyanates (TTI), in particular 4-isocyanatomethyl-1,8-octylenediisocyanate
2,4 and/or 2,6-hexahydrotoluylene diisocyanate ($H_6$TDI),
hexahydro-1,3 and/or 1,4-phenylene diisocyanate
perhydro-2,4' and/or 4,4'-diphenylmethane diisocyanate ($H_{12}$MDI), and in general aromatic amine precursors or the perhydrogenated carbamates,
bis-isocyanatomethyl cyclohexanes (in particular 1,3 and 1,4) (BIC),
bis-isocyanatomethyl norbornanes (NBDI),
2-methylpentamethylene diisocyanate (MPDI),
tetramethylxylylene diisocyanates (TMXDI), and
lysine diisocyanate and also the esters of lysine diisocyanate or triisocyanate (LDI or LTI).

The homocondensation products are the products derived from the condensation of one of the above-listed isocyanate monomers with itself. The heterocondensation products are the products derived from the condensation of two or more of the above-listed monomers, with one another and/or optionally with one or more mobile hydrogen compounds, such as for example an alcohol, a diol and other similar compounds.

The polyisocyanates included in the composition of the present invention may also be polyisocyanate derivatives derived from aromatic isocyanates used alone or mixed with aliphatic compounds.

However, the use of these aromatic derivatives is limited in terms of amount or even is not preferred as it generally leads to coatings which may become discoloured, generally turn yellow, as they age, in particular if the coatings are markedly exposed to UV radiation, for example solar UV radiation.

The following may be cited as non-limiting examples of aromatic isocyanates:
2,4- and/or 2,6-toluylene diisocyanate,
diphenylmethane-2,4' and/or 4,4'-diisocyanate (MDI),
1,3- and/or 1,4-phenylene diisocyanate,
triphenylmethane-4,4',4"-triisocyanate, and
the oligomers of MDI or TDI.

Mixtures of these (cyclo)aliphatic and/or aromatic polyisocyanates may also be used.

The polyisocyanates used to prepare the (poly)isocyanate compositions for the coating according to the invention have an average functionality in isocyanate groups at least equal to 2 and at most equal to 10, preferably greater than 2.5 and at most equal to 8, advantageously between 2.8 and 6.5.

The viscosity of the non-masked polyisocyanate compounds which can be used in the invention is within a very broad viscosity range owing to the structure of the polyisocyanate compounds which may be involved. The viscosity is generally greater than 10 mPa·s, at 25° C. with 100% dry extract, preferably greater than 100 mPa·s, at 25° C. and with 100% dry extract.

Examples include the viscosity of products from Rhodia such as Tolonate® HDT-LV2 having a viscosity of approximately 600 mPa·s±150 mPa·s, at 25° C., or else Tolonate® HDT having a viscosity of 2,400 mPa·s±400 mPa·s, at 25° C., or else Tolonate® HDB having a viscosity of 9,000 mPa·s±2000 mPa·s, at 25° C., or else Tolonate® HDT HR having a viscosity of approximately 20,000 mPa·s, at 25° C. with 100% dry extract, or 2,000 mPa·s at 25° C. at 90% dry extract in n-butyl acetate.

Specific polyisocyanate compounds are solid at 100% dry extract. This is the case, for example, for the isocyanurate trimer of IPDI or for the dimer of IPDI. Examples include the viscosities of some of these compounds in organic solutions; Tolonate® IDT 70 S (isocyanurate trimer of IPDI) thus has a viscosity of approximately 1,700 mPa·s±600 mPa·s at 25° C. in the case of a formulation having 70% dry extract in Solvesso® 100; Tolonate® IDT 70 B (isocyanurate trimer of IPDI) has a viscosity of approximately 600 mPa·s±300 mPa·s at 25° C. in the case of a formulation having 70% dry extract in n-butyl acetate.

In view of their capacity to impart high grit resistance to the coatings, homocondensation and/or heterocondensation products of an, in particular non-cyclic, aliphatic isocyanate monomer, preferably HDI, are preferred.

Moreover, it has been found that when the average functionality in isocyanate groups of the polyisocyanate increases, the grit resistance and the hardness of the coating are improved; this phenomenon is particularly marked during touch-up operations.

In the present invention, examples and claims, the average functionality in isocyanate groups f(iNCO) is defined by the following formula:

$$f(iNCO) = \frac{Mn \times [iNCO]}{42 \times 100}$$

wherein: Mn represents the number-average molecular weight obtained by gel permeation and
[iNCO] represents the concentration in isocyanate groups in grammes per 100 grammes.

The (poly)isocyanates present in the composition according to the invention may be in masked form, i.e. the isocyanate groups are not free but rather masked using a masking agent or a mixture of masking agents as defined hereinafter. Particularly preferred are compositions of masked polyisocyanates for the preparation of an one-component-type coating formulation (formulation 1K).

In the present disclosure, the term "masked (poly)isocyanate" refers to a (poly)isocyanate for which at least 50%, preferably 80%, advantageously 90% and more preferably still all of the isocyanate groups are masked.

The masking agent or mixture of masking agents which temporarily, or even permanently, protects the isocyanate groups is/are compounds having at least one group carrying a labile hydrogen, generally a group carrying a labile hydrogen, preferably a single group carrying a labile hydrogen, and which are reactive towards the isocyanate group. There may be associated with this group carrying a labile hydrogen a pKa value corresponding either to ionisation of an acid [including the hydrogen atom of the -ol groups (in the present description, the term "-ol(s)" refers to phenols and alcohols)] or to the associated acid of a (generally nitrogenous) base.

More specifically, in order to optimise the results of the present invention, said pKa (or one thereof if several may be defined) of the group carrying one or more labile hydrogens is at least equal to 4, advantageously 5, preferably 6 and is at most equal to 14, advantageously 13, preferably 12 and more preferably 10. However, one exception is the lactams, the pKa of which is greater than these values and which constitute possible (although not preferred) masking agents for the invention.

A masking agent is said to be temporary when the isocyanate group is temporarily protected by the masking agent and does not react under the conditions for storage of the system formulated with the hydroxyl groups of the mobile hydrogen compound, in particular the polyol, but is then released during the thermal crosslinking reaction in the furnace.

The released isocyanate group then reacts with the mobile or reactive hydrogen groups of the polyol to provide a urethane bond and to lead to the polyurethane network forming a portion of the coating. The temporary masking agent is either eliminated as a volatile organic compound with most of the formulation solvents, or remains in the film or reacts with the aminoplast resin if the formulation contains any.

Non-limiting examples of temporary masking agents according to the invention include the hydroxylamine derivatives such as hydroxysuccinimide and oximes such as methyethylketoxime, the hydrazine derivatives such as the pyrazoles, the triazole derivatives, the imidazole derivatives, the derivatives of the phenols or the like, the amide derivatives such as imides and lactams, the hindered amines such as N-isopropyl-N-benzylamine, and also the malonates or ketoesters and the hydroxamates. These compounds may optionally comprise substituents, in particular alkyl chains.

For determining the pKa values defined hereinbefore, reference may be made to "The determination of ionization constants, a laboratory manual", A. Albert of E. P. Serjeant; Chapman and Hall Ltd, London".

For the list for masking agents, reference may be made to Z. Wicks (Prog. Org. Chem., 1975, 3, 73 and Prog. Org. Chem., 1989, 9,7) and Petersen (Justus Liebigs, Annalen der Chemie 562, 205, (1949).

Preferred temporary masking agents include methylethylketoxime also known as MEKO, 3,5-dimethylpyrazole also known as DMP, 2 or 4 alkylimidazoles, dialkyl malonates, cyclic β-keto-esters, amines, hindered amines and caprolactam.

The present invention is not limited merely to temporary masking agents but can also involve what are known as permanent masking agents. Said permanent masking agents are characterised by the fact that the isocyanate groups are protected by the masking agent and do not react with the hydroxyl groups of the mobile hydrogen compound, in particular the polyol, under the conditions for storage of the formulated system nor during the thermal crosslinking reaction in the furnace.

The isocyanate groups are therefore not restored at the moment of the reaction of crosslinking by stoving in a furnace and remain masked, wherein said masked groups can then react under the conditions for crosslinking in the furnace with the (—N—CH$_2$—OH) methylol or —(N—CH$_2$—O-alkyl) alkoxyalkyl groups of the aminoplastic resins (melamines, benzoguanamine etc) in the presence of a, preferably sulphonic, acid catalyst or of a latent precursor of this catalyst which may be a tertiary amine salt of a sulphonic acid.

In specific cases, the surfactant present in the coating composition according to the invention may act as a catalyst, especially if the catalyst is of the anionic type and comprises a phosphorus atom.

Generally, the masking agents used permanently to protect the isocyanate group are, preferably monofunctional, hydroxyl or sulhydril compounds such as hydroxyl(cyclo) alkanes for example methanol, butanols, cyclohexanol, 2-ethylhexanol or compounds having carboxylic acid groups such as propanoic acid, pivalic acid, benzoic acid. These compounds may optionally carry one or more substituents.

These "permanent" masking agents may also be isocyanate groups masked by compounds comprising at least a crosslinkable group capable of polymerisation by UV radiation. Examples of "permanent" masking agents include hydroxyl-alkyl-acrylates or methacrylates.

In specific cases, use may also be made, generally in a limited amount, of the temporary bifunctional or polyfunctional masking agents comprising groups capable of providing temporary and/or permanent masked isocyanate groups. However, this is not preferred, as masked polyisocyanate compounds rapidly present high viscosities, especially if the functionality in isocyanate groups (NCO) is higher.

The compounds which have reactive (or mobile) hydrogen atoms and react with the (poly)isocyanates during the heat treatment preferably have at least two mobile hydrogen atoms up to about twenty mobile hydrogen atoms per molecule. These mobile hydrogen compounds are generally polymers which contain two or more (alcohol or phenol) hydroxyl groups and/or thiol groups and/or primary or secondary amine groups and/or which contain precursor groups, such as for example epoxy or carbonate groups, and release the hydroxyl groups by reacting with an appropriate nucleophile (an amine or water, for example).

Preferably, the compounds are selected from the polyols which may be used alone or mixed.

The polyols used in the formulation of the invention are advantageously selected from the acrylic or polyester or polyurethane or polyether polymers.

For reasons of flexibility of the coatings and, in particular, for the "priming" layer, use is preferably made of polyester polyols or urethane polyesters. Generally, use is made of a mixture of two polyester resins or urethane polyesters, one being characterised by a "hard" character and the other by a "soft" or "flexible" character. The hard or flexible character of the polyesters is imparted by the nature of the monomers used during the synthesis thereof.

Thus, a "hard" polyester will be obtained by choosing acid monomers or aromatic and/or cycloaliphatic and/or highly branched alcohols. Examples of this type of monomer include phthalic anhydride or cyclohexanediol or 2,2,4-trimethypentanediol.

A "flexible" polyester is obtained by choosing linear, hardly branched aliphatic monomers, such as adipic acid or 1,4-butanediol or 1,6-hexanediol, or else comprising in their structure heteroatoms such as diethylene or polyethylene glycols. However, such monomers are not desirable if these compounds have low stability under UV radiation.

Polyester polyols are used in industry and the synthesis thereof has been described at length and is known to a person skilled in the art. It will therefore not be described in the present document. For further details, reference may be made to the following works: "Materiaux polymeres, structure, proprietes et applications" by Gottfried W. Ehrenstein and Fabienne Montagne (Hermès Science 2000); "Handbook of Polyurethanes" by Michael Szycher, (CRC Press 1999); "Resins for Coatings, Chemistry, Properties and Applications" by D. Stoye and W. Freitag, (Hanser 1996), and also to the above-cited Eurocoat 97 article. Reference may also be made to the trade catalogues of the polyol distributors, in particular the book entitled "Speciality Resins, Creating the Solution Together" AKZO NOBEL RESINS (February 2001).

The average functionality in hydroxyl groups of the polyol polymers is at least equal to 2, generally between 3 and 20. Generally, for the intended application, an excessively high functionality would lead to excessively "hard" compounds and use is preferably made of polyester polyols having a relatively low functionality of less than 15, preferably less than 10.

The definition of the average functionality in hydroxyl groups per polymer chain is, for example, provided in the article by Ben Van Leeuwen "High Solids Hydroxy Acrylics and Tightly Controlled Molecular Weight" which appeared on page 507 of the Eurocoat 1997 conference series (pp. 505-515).

This average functionality F(OH) is calculated using the following equation:

$$F(OH) = \frac{\text{Number } OH * Mn}{56100}$$

wherein:
F(OH) represents the average functionality in hydroxyl groups;
Number OH represents the hydroxyl value expressed in mg of KOH (potassium hydroxide) per gramme of polymer;
Mn represents the number-average molecular weight of the polymer, itself determined by gel permeation chromatography (GPC), by comparison with calibrated polystyrene standards.

The number-average molecular weight of the polyester polyols used in the composition of the invention is generally between 500 and 10,000, preferably between 600 and 4,000.

In specific cases, use may also be made of a polyol or a mixture of polyacrylic polyols which impart a higher degree of hardness to the coating. These polyols may be "hard" or "flexible" depending on whether use is made of monomers having respectively an aromatic and/or cycloaliphatic and/or highly branched character for this "hard" property and of monomers having mostly an aliphatic character for "flexible" property.

The synthesis of acrylic polyols is also known to a person skilled in the art and further information concerning the syntheses thereof may be gleaned from the above-cited books.

The number-average molecular weight for acrylic polyols is generally between 134 and 50,000, preferably between 500 and 25,000, advantageously between 1,000 and 15,000.

The hydroxyl group content is generally between 10 and 750 mg of KOH per gramme of polymer, preferably between 15 and 500 mg of KOH per gramme of polymer.

For examples of acrylic polyols reference may be made to page 515 of the above-cited RHODOCOAT 97 article which indicates the characteristics of a few acrylic polyols, without these examples entailing any limitation.

Use may also be made of hyperbranched polyols which are generally characterised by a higher functionality than linear polyols, although these products are not preferred in view of their high viscosity.

Structured or blocked polyols may also be used if a property compartmentalisation effect is desired. However, these products, which are generally more expensive are used merely to provide a particular property. Examples of these compounds include a rheology agent or an agent to assist the dispersion of pigments.

Generally, for the purposes of the present invention, the isocyanate group/mobile hydrogen group ratio is between 1.5 and 0.5, and preferably between 1.2 and 0.8. In particular, if the mobile hydrogen compound is a polyol, the isocyanate group/hydroxyl group ratio is between 1.5 and 0.5, preferably between 1.2 and 0.8.

The composition according to the present invention also comprises an aminoplastic or aminoplast-type resin of the melamine formol and/or urea formol and/or benzoguanamine formol type. These polymers are known and details relating to the syntheses thereof are proposed in the above-cited works, in particular on page 102, Chapter 6.2 of the book by Stoye and Freitag.

These aminoplast resins react, in particular at a temperature of between 100 and 180° C., with the polyurethane network urethane groups previously created or formed during the reaction of crosslinking in a furnace by the reaction of the released isocyanate groups with the hydroxyl groups of the polyol or with the (R—O—C(=O)—NH$_2$) true carbamate groups optionally carried by the polyols or the polyisocyanates.

The reaction of crosslinking these melamines with the true urethane or (R—O—C(=O)—NH$_2$) carbamate groups is a known reaction which is generally catalysed by a strong acid such as para-toluenesulphonic acid or naphthalenesulphonic acid, or else a latent form of these acid catalysts, i.e. the tertiary amine salts of these strong acids. For more detailed information concerning these aminoplast resins and the syntheses thereof, reference may be made to the above-cited books.

The presence of one or more aminoplast resins in the coating composition according to the present invention is particularly advantageous for the formation of the base coat and is generally not necessary for the formation of the top coat, although this is not excluded from the scope of the invention.

As indicated hereinbefore, the compositions according to the invention impart to the substrates to which they are applied noteworthy properties of hardness and grit-resistance, in particular if they are applied, as a hardener for a priming layer, to a metallic substrate, for example aluminium and in particular stainless steel, or to a plastics material substrate. A further advantage of the coating compositions according to the invention is that the substrates have the noteworthy properties disclosed hereinbefore without the other properties in any way suffering.

The coatings thus obtained remain, in particular, resistant to chemical and/or biological attacks and are especially resistant, as they should be, to animal excreta, in particular to bird droppings.

In order to obtain these improved coating properties, one, two or three of the following conditions are preferably adhered to:
a) a ratio by weight of [optionally temporarily and/or permanently masked (poly)isocyanate]/[set of resins (polyester, aminoplast and masked (poly)isocyanate)] of between 5 and 80% by weight, preferably between 10 and 60% by weight and advantageously between 15 and 40% by weight;
b) a ratio by weight of surfactant/optionally temporarily and/or permanently masked polyisocyanate of between 0.1 and 20%, preferably between 0.25 and 10%, advantageously between 0.50 and 8%;
c) with a level of neutralisation of the ionic surfactant between half-neutralisation and complete neutralisation when an ionic surfactant is used.

There is observed, in particular for touch-up uses, an improvement in the anti-grit properties owing to the effect of synergy of surfactant additive and the polyisocyanate, said polyisocyanate preferably being selected from the (poly)isocyanate compounds having a hexamethylene diisocyanate-based aliphatic structure having high isocyanate functionality, generally greater than 2.5%, in particular greater than 3.5%.

The invention also relates to the process for the preparation of a multilayered coating as defined hereinbefore and comprising at least a (poly)isocyanate composition disclosed hereinbefore and having improved hardness and grit-resistance properties.

The process includes the step of mixing the various components of the coating using the conventional methods known in this field and may, for example, be carried out using traditional mixers, such as mixers, kneaders and grinders, depending on the viscosity of various components and the desired coating type. It will, however, be understood that the mixing may be carried out just before the application of the coating or else in the form of a ready-to-use formulation (1-component formulation or 1K formulation).

Furthermore, it may be advantageous to carry out separate pre-mixes of merely two or three of the components of the coating formulation, than to carry out two or three pre-mixes (2K or 3K formulations) just before use.

In the case of the present invention, preference is given to 1K-type formulations, i.e. formulations which are ready to use and contain all of the aforementioned components of the coating formulation.

It should, however, be noted that the surfactant or the mixture of surfactants is introduced into the (poly)isocyanate composition preferably before, during or after the reaction for masking of the isocyanate group by the masking agent.

However, the surfactant or the mixture of surfactants may also be incorporated directly into the polyurethane paint composition or be provided by one of the other components of the paint, i.e. with the polyol, the aminoplast resin, with the pigment or pigments, if it is a paint, or with the additives or with any other component of the final polyurethane composition.

For example, said surfactant may be incorporated into the polyisocyanate hardener or optionally with the catalyst. The person skilled in the art, who is a formulations specialist, will be able to determine the manner in which the surfactant(s) is/are introduced so as to obtain the composition according to the invention in solution form.

The present invention also relates to the substrates coated by the composition defined hereinbefore. The substrate may be of any type and is generally a metallic substrate, for example aluminium or steel, especially stainless steel. The substrate may also be a plastics material substrate, i.e. a thermoplastic or thermosetting polymer, optionally comprising fillers, for example reinforcing fillers, such as for example fibre glass, carbon fibres and the like.

Owing to the properties imparted by the aforementioned coating, the coated substrate may optionally be folded, shaped, stamped. The substrate thus coated has excellent grit resistance and also excellent resistance to pressure, or even high-pressure, washing, especially in the case of plastics material substrates.

The examples illustrating the invention are presented in the following experimental part and do not in any way limit the present invention.

Experimental Part

The main raw materials are commercially available industrial compounds, except for the additive-containing masked polyisocyanate hardener formulations of the surfactant which are prepared separately.

The starting materials which may be used for the synthesis of the masked polyisocyanate hardener formulations are:
  Methylethylketoxime (MEKO);
  RHODAFAC® RE 610 surfactant product sold by Rhodia, having a surfactant character and consisting of phosphate monoesters and diesters of polyoxyethylated nonylphenol;
  RHODAFAC® RS 610 LN surfactant, product sold by Rhodia having a surfactant character and consisting of phosphatemonoesters and diesters of polyoxyethylated fatty alcohols;
  Poly(ethylene glycol)monomethylether having a mass of 2,000 (POEG Me), nonionic compound;
  N,N dimethylcyclohexylamine (DMCHA): tertiary amine sold by Aldrich;
  TOLONATE® HDT HR 90 B, HDI-based polyisocyanate compound at 90% dry extract (D.E.) in n-butyl acetate sold by Rhodia, having an NCO content: 0.413 moles of NCO groups per 100 grammes and having a viscosity of approximately 2,000 mPa·s at 25° C. and at 90% D.E.;
  Tolonate® HDT LV2, HDI-based polyisocyanate compound at 100% dry extract (D.E.), sold by Rhodia, having an NCO content: 0.547 moles of NCO groups per 100 grammes and having a viscosity of approximately 600 mPa·s at 25° C.;
  Tolonate® D2, is a commercially available product supplied by Rhodia and is an HDI-based polyisocyanate formulation having a masked cyclo-isocyanurate MEKO, at 75% dry extract in Solvesso® 100. The potential NCO content is 11.2%. The viscosity is approximately 3,250 mPa·s at 25° C.

Synthesis of the Polyisocyanate Hardeners

The synthesis of the masked polyisocyanate hardener formulations is described in the following examples. The characteristics of the various masked polyisocyanate hardener formulations is presented in Table 1.

EXAMPLE 1

Neutralised Surfactant Hardener Solution (Hardener 1 with Tolonate® D2)

98 g of Rhodafac® RE 610 were introduced into a four-input double-casing reactor equipped with a mechanical stirrer, a cooler and metering vials. The mixture was brought to 45° C., then 17 grammes of N,N-dimethylcyclohexylamine were added. The reaction medium was stirred for 2 hours at 45° C. then left to cool to ambient temperature.

EXAMPLE 2

Synthesis of a Masked Polyisocyanate Hardener Formulation (Hardener 2)

3045 g of Tolonate® HDT HR 90 B, 974.2 g of Solvesso® 100 and 1095.6 g of MEKO were successively introduced into a double-casing three-necked reactor equipped with a mechanical stirrer, a cooler and metering vials. The reaction was exothermic and the temperature rose gradually to 95° C. The reaction medium was then stirred for 2 hours at 80° C. The viscosity of the product thus masked was 6650 mPa·s at 25° C. The potential NCO content was 10.33% (the potential content expresses the number of moles of NCO groups which can be restored by heating to about 150° C.).

There was then taken from this formulation 1009 g which were introduced into a reactor; 53.1 g of the formulation from Example 1 (Rhodafac® RE 610, 45.25 g, neutralised with 7.85 g of DMCHA) and 17.7 g of Solvesso® 100 were added so as to obtain a formulation having approximately 75% dry extract of additive-containing masked polyisocyanate hardener.

EXAMPLE 3 AND 4

Formulations of Masked Polyisocyanate Hardener (Hardeners 3 and 4)

The procedure was as for Example 2 except that, for Example 3, the (Rhodafac® RE 610 surfactant additive/dry masked polyisocyanate) ratio (1.45%) was changed and that, for Example 4, the Rhodafac® RS 610 LN surfactant was used at a (Rhodafac® RE610 surfactant additive/dry masked polyisocyanate) ratio of 3%. Reference will be made to the following Table 1 which specifies the charges and the characteristics of the products.

EXAMPLE 5

Synthesis of Formulations of Masked Polyisocyanate Hardener (Hardener 5)

The procedure was as for Example 2 except that the starting polyisocyanate used was the commercially available Tolonate® HDT LV2 and that the (surfactant/masked polyisocyanate at 100% dry extract) ratio was 5.98.

2616 g of Tolonate® HDT LV2, 1289.2 g of Solvesso® 100 and 1251.8 g of MEKO were successively introduced into a double-casing three-necked reactor equipped with a mechanical stirrer, a cooler and metering vials. The reaction was exothermic and the temperature rose gradually to 90° C. The reaction medium was then stirred for 2 hours at 80° C. The viscosity of the product thus masked was 6650 mPa·s at 25° C. The potential isocyanate group content was 11.72% (the potential content expresses the number of moles of isocyanate groups which can be restored by heating to about 150° C.).

There was then taken from this formulation 1009 g which were introduced into a reactor; 53.1 g of the formulation from Example 1 (Rhodafac® RE 610, 45.25 g, neutralised with 7.85 g of DMCHA) and 17.7 g of Solvesso® 100 were added so as to obtain a formulation having approximately 75% dry extract of additive-containing masked polyisocyanate hardener.

EXAMPLE 6

Formulations of Masked Polyisocyanate Hardener (Hardener 6)

The procedure was as in Example 5 but with a lower surfactant/masked polyisocyanate ratio (see Table 1).

EXAMPLE 7

Formulations of Masked Polyisocyanate Hardener (Hardener 7)

The procedure was as in Example 2 but the ionic surfactant was replaced with a nonionic surfactant, POEG Me.

Description of the Formulations

Polyol: Vialkyd® AN 927/70X and Vialkyd® VAN 6138/80X supplied by UCB Surface Specialities Aminoplastic resin: Maprenal® MF980/62B supplied by UCB Surface Specialities

TABLE 2

Formulation No. 1 for anti-grit OEM primer

| Components of the base formulation | Amount | Group | Supplier |
|---|---|---|---|
| Part 1 | | | |
| Vialkyd ® AN 927/70X | 22.45 | Hard polyester resin | UCB Surface Specialties |
| Kronos ® 2310 | 13.55 | Pigment (TiO2) | Kronos |
| Blanc Fixe micro | 18.50 | Filler | Sachtleben Chemie |
| Special Black SP 4 | 0.05 | Black pigment | Degussa |
| Aerosil ® R 972 | 0.30 | Rheology additive (calcined silica) | Degussa |
| Ircogel ® 905 | 0.20 | (calcium-based) Rheology additive | The Lubrizol Corp. |
| Butyl diglycol | 2.10 | Solvent | |
| BYK ®-358 N | 0.60 | Spreading agent | BYK Chemie |
| Additol ® VXL 6212 | 0.20 | Wetting and dispersing agent | UCB Surface Specialties |
| Methoxy propyl acetate | 0.20 | Solvent | |

The mixture was ground using a ball mill until fineness 9 (NORTH gauge) was achieved, then Part 2 was added:

| Part 2 | | | |
|---|---|---|---|
| Solvesso ® 100 | 10.50 g | Solvent (alkyl benzene fraction) | ExxonMobil Chemical |
| Exxal ® 13 | 2.50 g | Anti-pinhole agent (isotridecanol) | ExxonMobil Chemical |
| Vialkyd ® AN 903/70 EPAC | 9.60 g | Flexible polyester resin | UCB Surface Specialties |
| Maprenal ® MF 980/62 B | 5.55 g | Benzoguanamine | UCB Surface Specialties |

TABLE 1

Formulations of masked polyisocyanate hardeners in the presence of surfactant

| | Formulation | | | | | | |
|---|---|---|---|---|---|---|---|
| | 1 | 2 | 3 | 4 | 5 | 6 | 7 |
| Ratio of (surfactant/masked polyisocyanate with 100% dry extract) in % | 6 | 5.98 | 1.45 | 3 | 5.98 | 3.42 | 3.5 |
| Components (amount in g) | | | | | | | |
| Tolonate ® HDT HR 90 B | | 600.7 | 595.3 | 595.3 | | | 595.3 |
| Tolonate ® HDT LV 2 | | | | | 511.8 | 520.5 | |
| MEKO | | 216.1 | 214.2 | 214.2 | 244.9 | 249 | 214.2 |
| Tolonate ® D2 (75% D.E.) | 1009 | | | | | | |
| Rhodafac ® RE 610 | 45.25 | 45.25 | 10.82 | | 45.25 | 22.41 | |
| Rhodafac ® RS 610 LN (DV 6175) | | | | 22.5 | | | |
| POEG Me | | | | | | | 26.3 |
| DMCHA | 7.85 | 7.85 | 1.88 | 3.8 | 7.85 | 3.89 | |
| Solvesso ® 100 | 17.7 | 192.1 + 17.7 | 190.5 + 4.1 g | 190.5 + 4.1 g | 252.2 + 17.7 | 256.5 + 8.7 | 190.5 + 8.7 |

-continued

Part 2

| | | | |
|---|---|---|---|
| Masked polyisocyanate hardener formulation of the invention to be tested | 13.50 g | Additive-containing masked blocked polyisocyanate | Rhodia PPMC |
| Additol ® XL 480 | 0.20 g | Spreading agent | UCB Surface Specialties |
| | 100.00 g | | |

Characteristics of the Formulation

| | |
|---|---|
| Dry extract | Approximately 68% |
| Ratio by weight of the resins used | Polyesters/Benzoguanamine/blocked polyisocyanate: 62.3/9.6/28.1 |
| Pigment to binder ratio | 90/100 = 0.90 |
| Application viscosity | 28 seconds FF 4* 23° C. |
| Dilution | 70 seconds FF 4* with Solvesso ® 100 |
| | 28 seconds FF 4* with xylene/butyl acetate (40/60) |

*FF 4: Ford Fraction No. 4

Preparation of the Anti-Grit OEM Primer to be Tested

Added to a reactor were all of the components from part 1 which had been ground using a ball mill until fineness 9 (North gauge) was obtained. Components from part 2 were then added and all of the components mixed.

The formulation was then applied to the preserved support.

Production of the Coating

The coating was produced under standard conditions for the preparation of an original equipment manufacturer (OEM) coating and the formulations were applied using a pneumatic gun.

The conditions for application are described hereinafter.

The support used was in the form of coatings for standard pre-treated "Offredy"—type plates covered with a PP1 cataphoresis treatment having plate reference EC 090190 DB PP1.

The primer formulation to be tested was applied to this plate using a pneumatic gun. After application, rapid (flash) evaporation was carried out for 10 minutes at ambient temperature before furnace stoving was carried out at a temperature of 150° C. for 30 minutes. The thickness of the primer was from 30 to 35 micrometres (μm).

After stoving and cooling, a commercially available aluminium grey PSA solvent base (PE/MEL/CAB), reference PPG, was applied using a pneumatic gun. The application thickness was approximately 15 μm. Flash evaporation was then carried out at ambient temperature for 10 minutes before a standard car varnish, reference Varnish (ASRY/MEL/Crosslinker) HTR 3000 PPG for PSA, was applied wet on wet. The application thickness was approximately 40 μm.

After flash evaporation for 10 minutes at ambient temperature, furnace stoving was carried out at 140° C. for 30 minutes.

The coating was then left at ambient temperature for one day before the properties of the coating were measured.

Physicochemical Properties

The physicochemical measurements characterising the properties of the coatings obtained using the various systems are as follows:

Persoz hardness: the pendulum hardness measurements were taken on the polymerised film to be tested.

Xylene softening: the measurements were taken on the polymerised film to be tested.

Grit resistance: using PSA method No. D24 1312.

Impact resistance measurements: using the Erichsen Drawing method and to standard ASTM ISO 6212.

The thicknesses of the films on the substrate were monitored systematically.

Results:

The formulations of the invention were compared with an already optimised standard formulation, known as the comparative control, containing no surfactant additive.

The results of the various tests are summarised in the following Table 3.

| FORMULATION | Thickness of the primer in μm | Persoz hardness (s) | Xylene softening* | Erichsen drawing (mm) | Impact resistance ISO 6212 (cm · kg) | Original equipment manufacturer gritting D24 1312 target rating: <2 | Touch-up gritting D24 1312 target rating: <3 |
|---|---|---|---|---|---|---|---|
| Comparative control Tolonate D2 | 32 | 138 | 0 | 7.8 | 6 | 2 | 2 |
| CMI 1630A Formulation 1 | 33 | 157 | 1 | 7.4 | 6 | 1-2 | 1-2 |
| CMI 1628A Formulation 2 | 34 | 168 | 0 | 7.8 | 10 | 1 | 2 |
| CMI 1628C Formulation 3 | 33 | 169 | 0 | 7.0 | 4 | 2 | 1 |
| CMI 1628E Formulation 4 | 33 | 157 | 1 | 6.8 | 6 | 1-2 | 3 |
| CMI 1629A Formulation 5 | 33 | 129 | 0 | 7.2 | 4 | 1 | 3 |
| CMI 1629B Formulation 6 | 33 | 148 | 1 | 7.3 | 6 | 1 | 3 |

*0: no softening, 1: softening, 2: destruction of the film

Conclusions Concerning the Results Obtained:

1. Compared to the control, the addition of surfactant additive to the masked polyisocyanate hardener formulation, and therefore to the 1K paint formulation, allows a gain in Persoz hardness of on average greater than 20 seconds (formulations 1, 2, 3, 4, 6 and the comparative formulation).

2. Whatever the nature of the polyisocyanate used, the addition of surfactant additive to the masked polyisocyanate hardener formulation, and therefore to the 1K paint formulation, allows the original equipment manufacturer grit resistance to be improved. In practice, all of the coatings of the invention were found to be better than the control coating.

3. The surfactant Rhodafac® RE 610 was found to be slightly better than the surfactant Rodafac® RS 610 LN, for the same starting blocked polyisocyanate (comparison of formulations 3 and 4).

4. During touch-up, specific systems were found to be at least equivalent, or even better, in terms of anti-grit property than the optimised comparative control (formulations 1, 2, 3). These formulations, which are already excellent in terms of original equipment manufacturer anti-grit properties, constitute systems having excellent performance levels.

There will be noted from these systems a particularly beneficial synergy of the surfactant additive and the masked polyisocyanate.

This effect is particularly for paints in OEM applications, especially coil and can coating.

The invention claimed is:

1. A process for providing a coating on a substrate, comprising coating said substrate with a solution having the following composition:
   a) at least one (poly)isocyanate composition;
   b) at least one surfactant;
   c) at least one compound carrying at least one mobile hydrogen moiety selected from the group consisting of the primary or secondary hydroxyl, phenol, primary and/or secondary amine, carboxylic groups and an SH group; and
   d) at least one organic solvent,
   and then crosslinking said composition into a hard and resilient coating, wherein the amount of water in the composition is such that the ratio by weight of (water)/[(poly)isocyanate+surfactant] is from 0% to 10%,
   compound (a) and compound (b) are present in an amount from 5% to 20% by weight, based on the total weight of the composition without solvent (% dry solids);
   compound (c) is present in an amount from 55% to 80% by weight, based on the total weight of the composition without solvent (% dry solids); and
   compound (d) is present in an amount from 35% to 55% by weight, based on the total weight of the composition.

2. The process as defined by claim 1, wherein said composition has an amount of water such that the ratio by weight of (water)/[(poly)isocyanate+surfactant] is from 0% to 0.5%.

3. The process as defined by claim 1, wherein the crosslinking is by heat treatment carried out at a temperature of from 60° C. to 300° C., for a duration of from a few seconds to a few hours.

4. The process as defined by claim 1, wherein the composition further comprises:
   e) at least one aminoplastic resin ("aminoplast") of the melamine-aldehyde, or benzoguanamine type, and/or an alkoxyalkyl derivative thereof.

5. The process as defined by claim 1, said composition being a hardener for the priming layer of a coating.

6. The process as defined by claim 1, for the preparation of a coating for original equipment manufacture.

7. The process as defined by claim 1, for a touch-up operation.

8. The process as defined by claim 4, wherein the composition further comprises:
   f) at least one catalyst for the reaction between the compound a) and the compound c), and/or at least one strong-acid-type compound, or a latent form of said strong acid, as a catalyst for the reaction between the melamine and/or urea compounds or the derivatives thereof and the true urethane or carbamate groups.

9. A composition in the form of a solution comprising:
   a) at least one (poly)isocyanate composition;
   b) at least one surfactant;
   c) at least one compound carrying at least a mobile hydrogen moiety from the group consisting of primary or secondary hydroxyl, phenol, primary and/or secondary amine, carboxylic groups and an SH group; and
   d) at least one organic solvent,
   wherein the amount of water in the composition is such that the ratio by weight of (water)/[(poly)isocyanate+surfactant] is from 0% to 10;
   compound (a) and compound (b) are present in an amount from 5% to 20% by weight, based on the total weight of the composition without solvent (% dry solids);
   compound (c) is present in an amount from 55% to 80% by weight, based on the total weight of the composition without solvent (% dry solids); and
   compound (d) is present in an amount from 35% to 55% by weight, based on the total weight of the composition.

10. The composition as defined by claim 9, having an amount of water such that the ratio by weight of (water)/[(poly)isocyanate+surfactant] is from 0% to 0.5%.

11. The composition as defined by claim 9, further comprising:
   e) at least one aminoplastic resin ("aminoplast") of the melamine-aldehyde, or benzoguanamine type, and/or an alkoxyalkyl derivative thereof.

12. The composition as defined by claim 9, comprising a nonionic or anionic surfactant optionally comprising a polyethylene glycol and/or propylene glycol chain fragment of at least 1 oxyethylenyl and/or oxypropylenyl units.

13. The composition as defined by claim 9, said surfactant being an anionic surfactant having the following Formula (I):

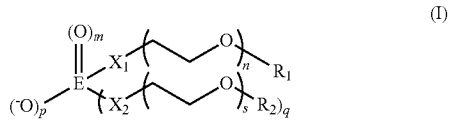

wherein:
   E is phosphorus, carbon and or sulfur;
   $R_1$ and $R_2$ are the same or different and independently are each a hydrocarbon radical, an optionally substituted $C_6$-$C_{30}$ aryl radical and $C_1$-$C_{20}$ alkyl radicals, and optionally substituted $C_{10}$-$C_{20}$ alkyl radicals;
   $X_1$ is a bond or a divalent radical selected from among the group consisting of:
   —$Y_1$—, -$A_1$-, -$A_1$-$Y_1$—, —$Y_1A_1$-, —$Y_1$-$A_1Y'_1$ and [E(O)$_m$(O⁻)$_p$]—;
   $X_2$ is a bond or a divalent radical selected from among the group consisting of:
   —$Y_2$—, -$A_2$-, -$A_2$-$Y_2$—, —$Y_2A_2$-, and —$Y_2$-$A_2Y'_2$;
   $A_1$ and $A_2$ are the same or different and independently are each an optionally substituted, including functionalized, alkylene divalent radical;
   $Y_1$, $Y'_1$, $Y_2$ and $Y'_2$ are the same or different and are each a chalcogen, a metalloid element of atomic ranks at most equal to that of phosphorus and pertaining to column VB of the periodic table of elements classification, in the form of amine or tertiary phosphine derivatives, the radical providing the tertiary character containing at most 4 carbon atoms;

m is 0 or an integer equal to 1 or to 2;
n is 0 or an integer of from 1 to 30;
p is an integer equal to 1, 2 or 3;
q is 0 or 1; and
s is 0 or an integer of from 1 to 30;
with the proviso that if E is the carbon atom, then q is equal to 0, m is 1 and $X_1$ is a bond or a divalent radical selected from among the group consisting of:

-$A_1$-, —$Y_1$-, -$A_1$-$Y_1$-, —O—C(=O)—O— and —[C(O)$_m$(O$^-$)$_p$]—.

14. The composition as defined by claim 9, wherein said surfactant, has a total number of carbon atoms being at most 100.

15. The composition as defined by claim 9, wherein the (poly)isocyanate is a homocondensation or heterocondensation product of an alkylene diisocyanate.

16. The composition as defined by claim 9, wherein the (poly)isocyanate comprises a (poly)isocyanate originating from homocondensation or heterocondensation of the following monomeric aliphatic, (cyclo- or aryl-)aliphatic isocyanates:

1,6-hexamethylene diisocyanate,
1,12-dodecane diisocyanate,
cyclobutane-1,3-diisocyanate
cyclohexane-1,3 and/or 1,4-diisocyanate,
1-isocyanato-3,3,5-trimethyl-5-diisocyanatomethyl cyclohexane (isophorone diisocyanate, IPDI),
isocyanatomethyloctylene diisocyanates (TTI),
2,4 and/or 2,6-hexahydrotoluoylene diisocyanate ($H_6$TDI),
hexahydro-1,3 and/or 1,4-phenylene diisocyanate
perhydro-2,4' and/or 4,4'-diphenylmethane diisocyanate ($H_{12}$MDI), and in general aromatic amine precursors or the perhydrogenated carbamates,
bis-isocyanatomethyl cyclohexanes (in particular 1,3 and 1,4) (BIC),
bis-isocyanatomethyl norbornanes (NBDI),
2-methylpentamethylene diisocyanate (MPDI),
tetramethylxylylene diisocyanates (TMXDI),
lysine diisocyanate and also the esters of lysine diisocyanate or triisocyanate (LDI or LTI),
2,4- and/or 2,6-toluoylene diisocyanate,
diphenylmethane-2,4' and/or 4,4'-diisocyanate (MDI),
1,3- and/or 1,4-phenylene diisocyanate,
triphenylmethane-4,4',4'''-triisocyanate, and
the oligomers of MDI or TDI.

17. The composition as defined by claim 9, wherein the (poly)isocyanate comprises a (poly)isocyanate having an average functionality in isocyanate groups at least equal to 2 and at most equal to 8.

18. The composition as defined by claim 9, wherein the (poly)isocyanate compounds are masked.

19. The composition as defined by claim 9, wherein the at least a mobile hydrogen moiety which reacts with the (poly)isocyanate during heat treatment is a polymer containing two or more hydroxyl (alcohol or phenol) groups and/or thiol groups and/or primary or secondary amine groups and/or containing epoxy or carbonate-type precursor groups which release the hydroxyl groups by reacting with an nucleophile.

20. The composition as defined by claim 9, wherein the (poly)isocyanate has a hexamethylene diisocyanate-based aliphatic structure having isocyanate functionality greater than 2.5%.

21. The composition as defined by claim 11, wherein the amount of aminoplast resin(s) is from 15% by 25% by weight based on the total weight of the composition without solvent (% dry solids).

22. The composition as defined by claim 11, further comprising:
f) at least one catalyst for the reaction between the compound a) and the compound c), and/or at least one strong-acid-type compound, or a latent form of said acid, as a catalyst for the reaction between the melamine and/or urea compounds or the derivatives thereof and the true urethane or carbamate groups.

23. The composition as defined by claim 11, wherein the aminoplastic or aminoplast-type resin comprises a melamine formol and/or urea formol and/or benzoguanamine formol-type resin.

24. The composition as defined by claim 11, wherein at least one of the following conditions is satisfied:
a) a ratio by weight of [(poly)isocyanate]/[set of resins (polyester, aminoplast and masked polyisocyanate)] of from 5% to 80% by weight;
b) a ratio by weight of surfactant/masked polyisocyanate of from 0.1% to 20%;
c) a level of neutralization of ionic surfactant between half-neutralization and complete neutralization when an ionic surfactant is present.

25. The composition as defined by claim 22, wherein the amount of catalyst(s) is from 0% to 0.5% by weight based on the total weight of the composition without solvent (% dry solids).

26. The composition as defined by claim 12, wherein less than 50% by mass of the surfactant is in a form bound to (poly)isocyanate by a chemical bond.

27. The composition as defined by claim 12, wherein the surfactant is an anionic agent having at least a group selected from the group consisting of aryl sulphates, and/or alkyl sulphates, aryl phosphates, alkyl phosphates, aryl phosphonates, aryl phosphinates, aryl sulphonates, alkyl phosphonates, alkyl phosphinates and alkyl sulphonates.

28. The composition as defined by claim 14, wherein the surfactant comprises an anionic surfactant in a neutralized form.

29. The composition as defined by claim 17, wherein the (poly)isocyanate have has a viscosity greater than 10 mPa·s, at 25° C. with 100% dry extract, and being solid with 100% dry solids.

30. The composition as defined by claim 18, wherein the (poly)isocyanate compounds are masked by a compound having at least a group carrying a labile hydrogen.

31. The composition as defined by claim 18, wherein the masking agent of the (poly)isocyanate is selected from the group consisting of a hydroxylamine, a hydrazine, a triazole derivatives, the imidazole, a phenol, an amide, a hindered amine, a malonate, a ketoester, a hydroxyamate compounds having hydroxyl or sulhydril groups, cyclohexanol and compounds having carboxylic acid groups.

32. The composition as defined by claim 19, wherein the at least one compound carrying at least a mobile hydrogen moiety comprises a polyol selected from the group consisting of acrylic, polyester and polyurethane polymers.

33. The composition as defined by claim 32, wherein the polyol has a functionality at least equal to 2.

34. The composition as defined by claim 32, wherein the polyol comprises a polyester polyol having a number-average molecular weight of from 500 to 10,000.

35. The composition as defined by claim 32, wherein the polyol comprises an acrylic polyol having a number-average molecular weight of from 134 to 50,000.

36. A substrate coated with at least one crosslinked (poly)isocyanate composition as defined by claim 9.

* * * * *